Patented Apr. 24, 1951

2,550,381

UNITED STATES PATENT OFFICE 2,550,381

PHOTOCELL AGING

Auguste Louis Marie Antoine Rouy,
New York, N. Y.

No Drawing. Application April 26, 1946,
Serial No. 665,327

2 Claims. (Cl. 136—89)

This invention relates to a photo colorimetry.

A principal object of this invention is to provide a method for improving or normalizing the characteristics of photo-electric cells for use in photo colorimetry.

Other objects and advantages will appear as the description of my particular method progresses and the novel features thereof will be particularly pointed out in the appended claims.

Those familiar with photo-electric cells as used in photo colorimetry are well aware that cells of precisely the same physical dimensions and construction and fabricated in precisely the same way are by no means electrically identical or normal.

It is further known by those skilled in photo-electric colorimetry that photo-electric cells, when exposed to light, require various elapsed times to reach a suitable condition such that the electrical variation thereby caused may be ascertained by a measurement which may be relied on because steady.

My method contemplates treating photo-electric cells so that all cells of identical manufacture will become more nearly identical or normal, in their electrical characteristics and, when used in a photo-electric colorimeter, will more quickly come to a steady difference of potential and to a more nearly average value or normal value of that potential value.

My method comprises treating photo-electric cells to an aging process by subjecting them to light for a predetermined time followed by exposure to darkness for a predetermined time, continued for a predetermined period while a predetermined resistance is in series therewith so that a predetermined current flow will be caused until the cell reaches a condition such that upon exposure to light a steady value of difference of potential is reached in a few minutes. Each photo-electric cell is connected in series with an ohmic resistance. As a general rule in aging photo-electric cells I arrange the intensity of light and the external ohmic resistance such that the current flowing through the circuit will be from about 0.1 to 0.3 microamperes density of current per square millimeter of sensitive surface with an average of about 0.2 being the value most commonly used.

With a cell as commonly used by me, a selenium cell having a surface of about 700 square millimeters, I use 100 ohms in series with the cell. I then expose the sensitive surface of the cell to a light source of such intensity that with the 100 ohms in series with the cell a difference of potential will be generated such that about 100 microamperes pass through the circuit. The light is allowed to impinge upon the sensitive surface of the cell for about eight hours and then the cell is placed in complete darkness for about sixteen hours. This operation is repeated for a period of from ten to forty days.

After this aging, different photo-electric cells, all manufactured at the same time under identical manufacturing conditions, have electrical characteristics which closely approach an average or normal.

After such aging, any photo-electric cell placed in a photo-electric colorimeter and subjected to light reaches a steady value in two or three minutes, whereas an unaged identical cell will not reach a steady value in thirty minutes.

What I claim, and desire to secure by Letters Patent of the United States, is:

1. The method of bringing selenium photo-electric cells most closely to a permanent average value of electrical variation when exposed to light which comprises aging the cells, while in closed circuit with an external resistance, to a light of such intensity that the current which flows in the circuit equals a density of from 0.1 to 0.3 microamperes per square millimeter of sensitive surface for about eight hours time followed by exposure to complete darkness for about sixteen hours time and alternating the exposure for a period of from ten to forty days.

2. The method of bringing selenium photo-electric cells most closely to a permanent average value of electrical variation when exposed to light which comprises aging the cells, while in closed circuit with an external resistance, to a light of such intensity that the current which flows in the circuit equals a density of from 0.1 to 0.3 microamperes per square millimeter of sensitive surface for about eight hours time followed by exposure to complete darkness for about sixteen hours time and alternating the exposures until the cell, after a period of rest, will, upon being exposed to light, generate a steady difference of potential within about two minutes.

AUGUSTE LOUIS MARIE ANTOINE ROUY.

REFERENCES CITED

The following references are of record in the file of this patent:

Fogle: "Trans. Electrochemical Society," vol. 69 (1936), page 445.

Barnard, G. P.: "The Selenium Cell" (1930) pages 102–104.

Wilson, E. D.: "Electronics," January 1939, pages 15 and 32.